G. McKENZIE.
MACHINE FOR MOLDING SECTIONS OF CONDUIT PIPE.
APPLICATION FILED JAN. 16, 1917. RENEWED OCT. 10, 1917.

1,254,615.

Patented Jan. 22, 1918.
4 SHEETS—SHEET 1.

WITNESS
O. Johnson

INVENTOR
George McKenzie
BY
C. D. Haskins
ATTORNEY

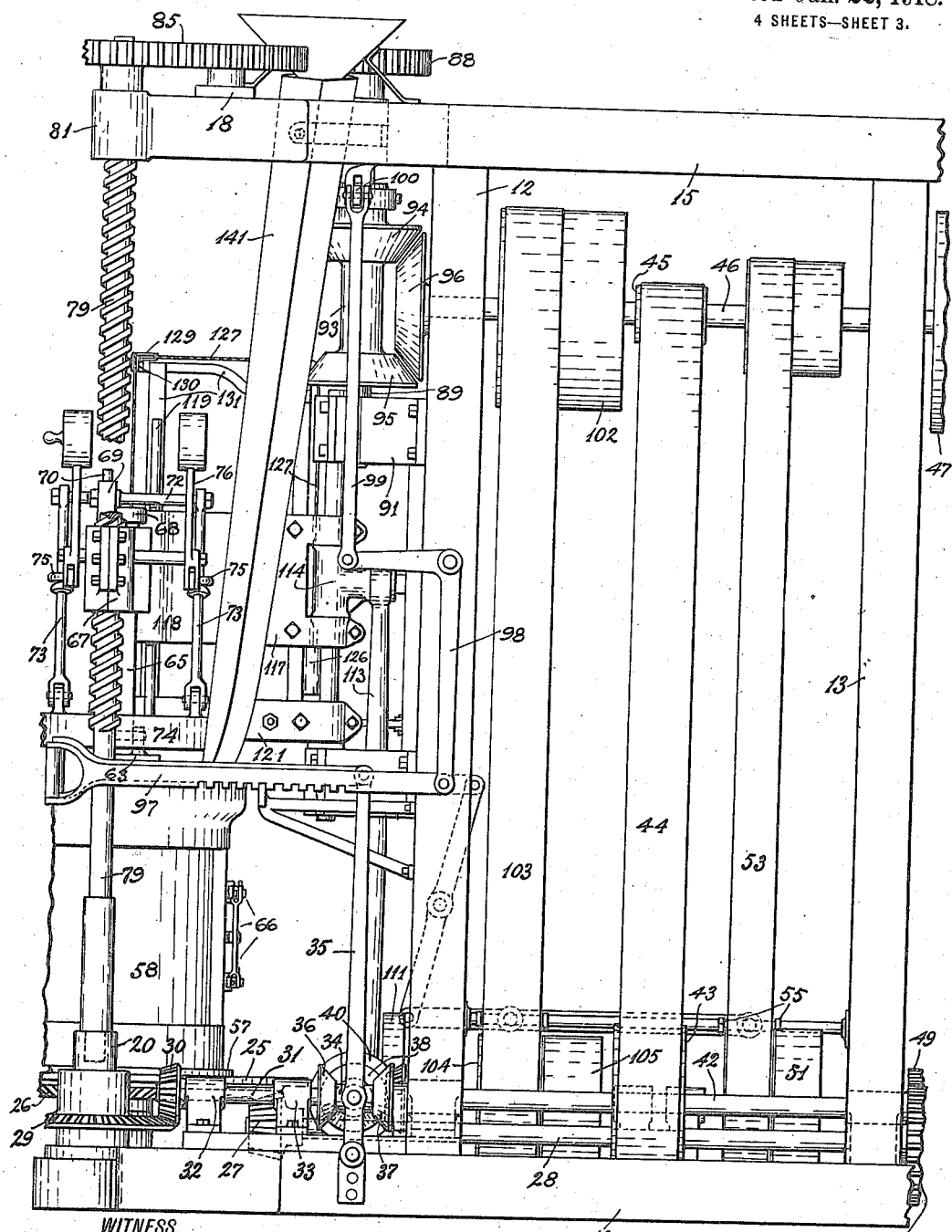

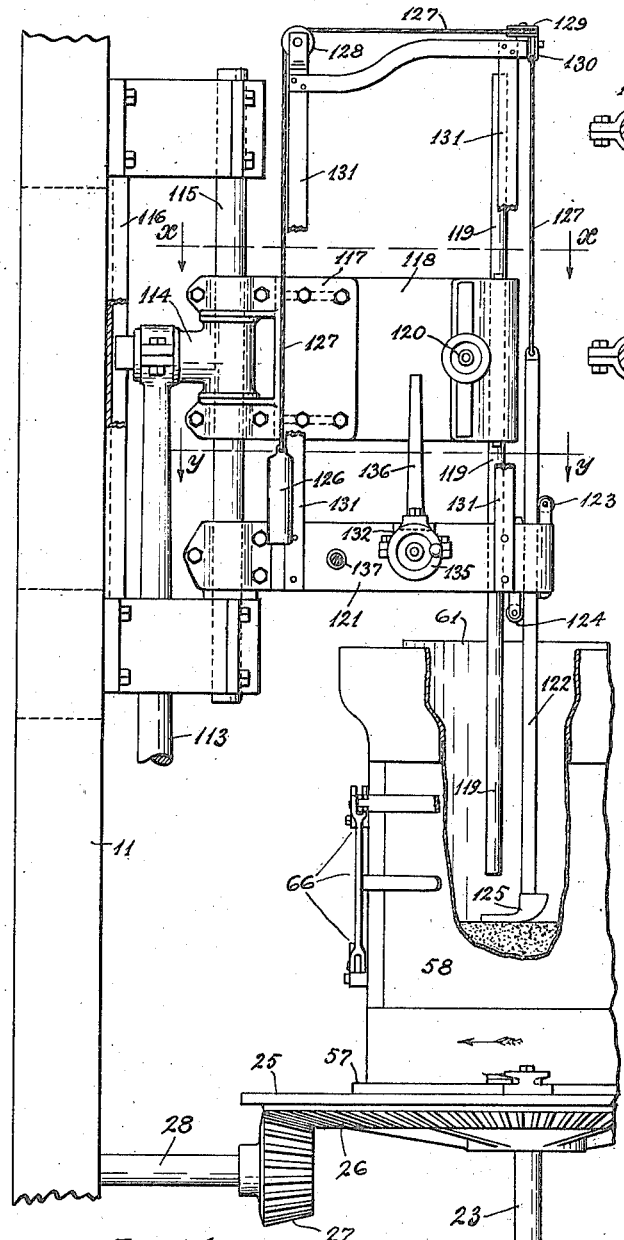

UNITED STATES PATENT OFFICE.

GEORGE McKENZIE, OF EVERETT, WASHINGTON.

MACHINE FOR MOLDING SECTIONS OF CONDUIT-PIPE.

1,254,615.        Specification of Letters Patent.        Patented Jan. 22, 1918.

Application filed January 16, 1917, Serial No. 142,755. Renewed October 10, 1917. Serial No. 195,859.

*To all whom it may concern:*

Be it known that I, GEORGE McKENZIE, citizen of the United States, residing at Everett, in the county of Snohomish and State of Washington, have invented a certain new and useful Improvement in Machines for Molding Sections of Conduit-Pipe, of which the following is a specification.

My invention relates to improvements in machines for molding sections of conduit pipe, and the object of my invention is to provide a power actuated pipe molding machine which shall embody a hopper, a mold comprising separable parts and improved means for separating and assembling said separable parts, and which shall be adapted automatically to operate to mold into the form of a section of conduit pipe any plastic material as potters' clay, concrete cement and like earthy matter that may be deposited within said hopper.

Figure 1:
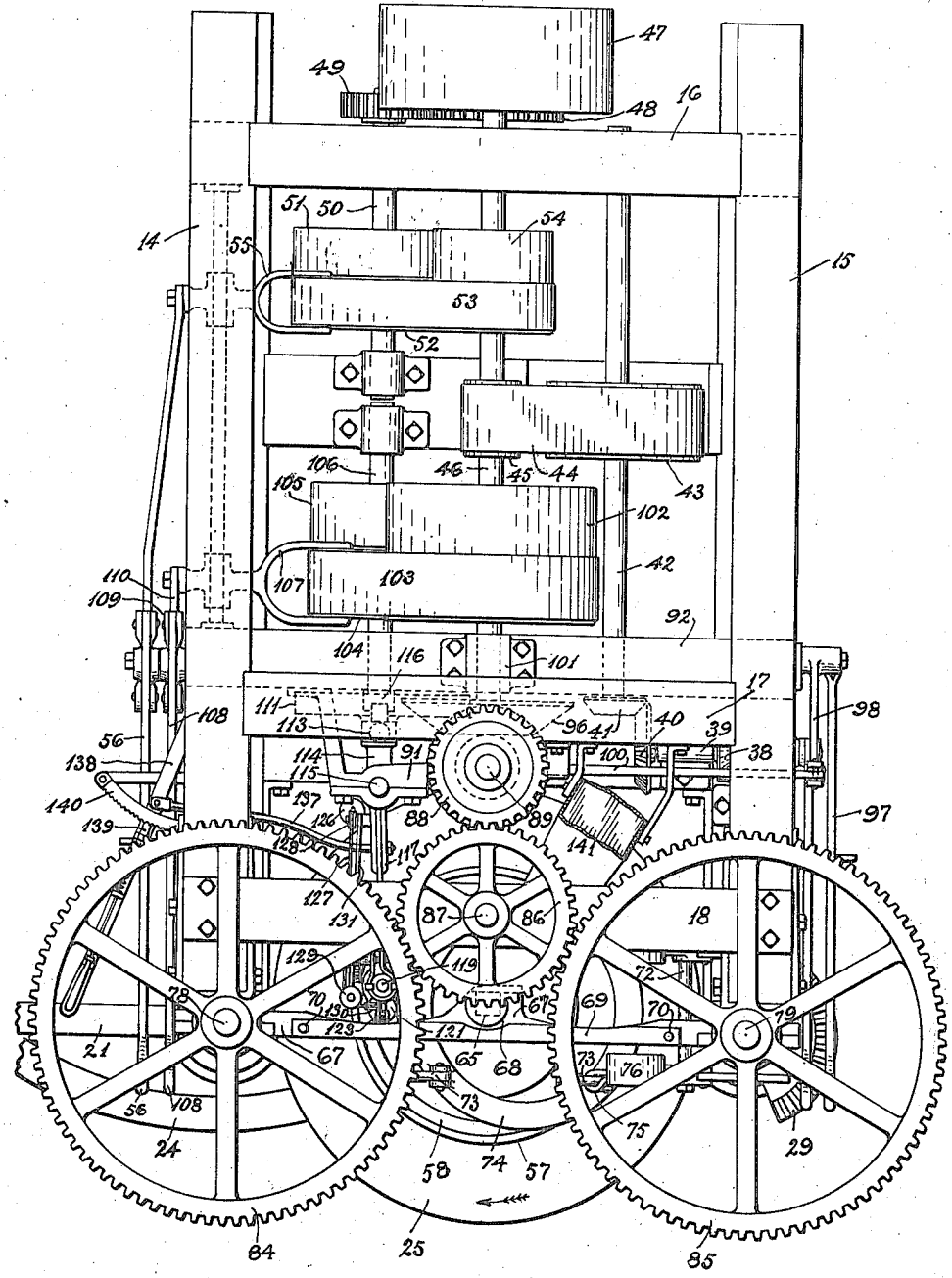
Figure 2:
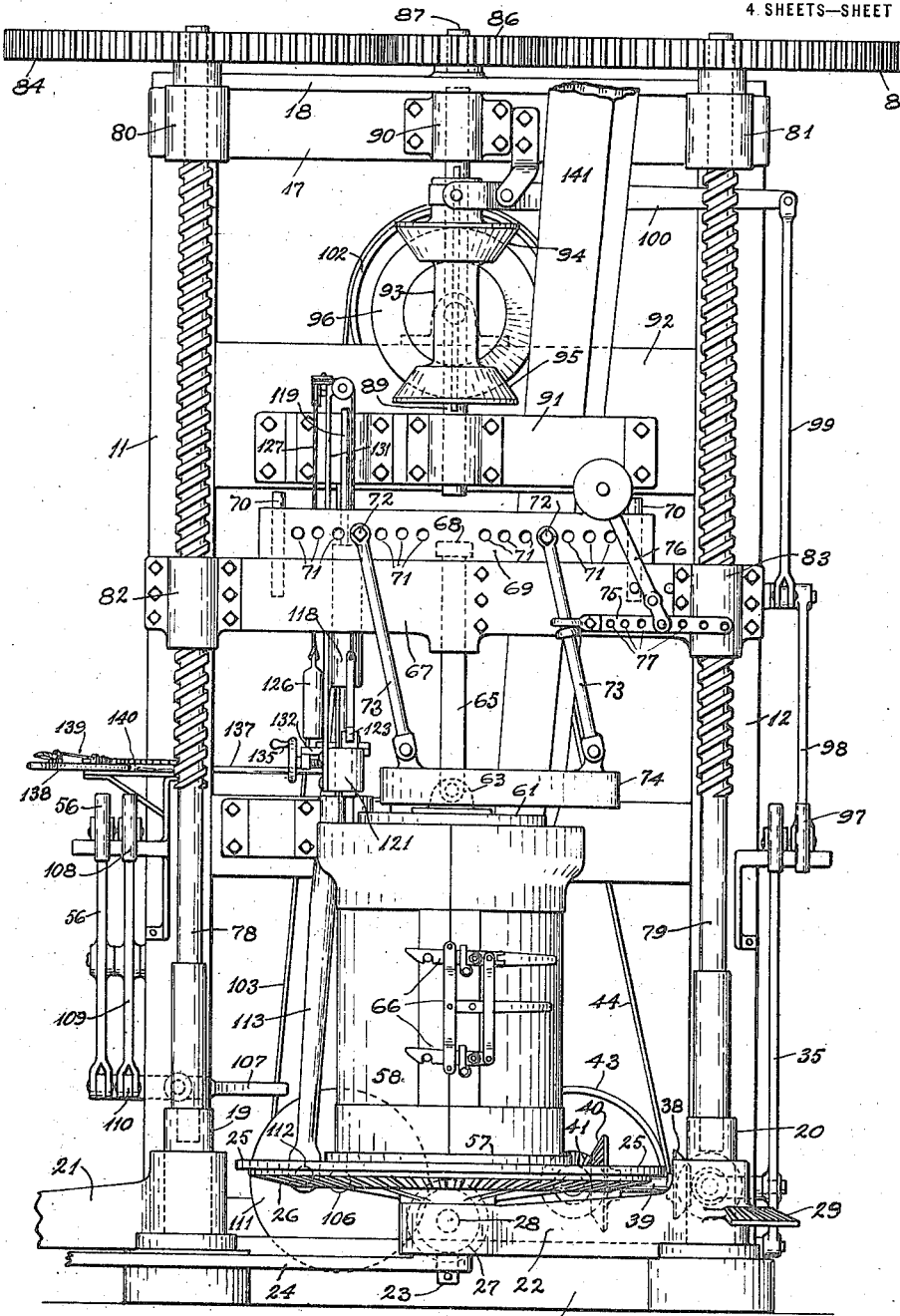

I accomplish this object by devices illustrated in the accompanying drawings wherein Figure 1 is a plan view of a machine embodying my invention; Fig. 2 is a view of the same in front end elevation; Fig. 3 is a view of the same in side elevation; Fig. 4 is a view in side elevation, on an enlarged scale, of certain associated parts of the same; Fig. 5 is a view in horizontal section on broken line *x, x* of Fig. 4 showing details of the same; Fig. 6 is a view in horizontal section on broken line *y, y* of Fig. 4 showing other details of the same; Fig. 7 is a fragmentary view in vertical mid-section of the mold and certain associated parts embodied in my invention; and Fig. 8 is a fragmentary view in side elevation of details of my invention.

Referring to the drawings, throughout which like reference numerals designate like parts, upon a frame base 10 is erected a frame comprising two oppositely disposed side studs 11 and 12 and two other oppositely disposed side studs (only one of which is shown as the stud 13 in Fig. 3) together with top side rails 14 and 15 and top cross-rails 16, 17 and 18.

The front end portion of the frame base 10 projects from the lower ends of the studs 11 and 12 and upon each of the opposite corners of said front end portion is fixed an upwardly projecting stud, as studs 19 and 20 shown more clearly in Fig. 2, and upon each of said studs 19 and 20 is mounted an arm (as arms 21 and 22 respectively) which is adapted to be swung in a horizontal plane thereon.

The outer end portion of each of the arms 21 and 22 is provided with a hole extending therethrough in a direction that is parallel with the axes of the studs 19 and 20, and rotatably disposed within said hole of each outer end portion of each of said arms 21 and 22 to extend downwardly to project from the underside thereof is a shaft like the shaft 23 in the arm 22 of Fig. 2, the outer end portion of said arm 21, for convenience of drawing, being broken away whereby the other shaft with its associated parts, that is like the shaft 23 is not shown.

The outer end portions of the two arms 21 and 22 are connected together by a connecting bar 24 that is articulated to each of the downwardly projecting end portions of the two shafts, only the shaft 23 of which is shown, the points of articulation on said bar 24 being the same distance from each other as is the distance between the axes of said two shafts, whereby said two arms 21 and 22 may swingingly move only synchronously in an obvious manner.

Concentrically mounted on the upper end of shaft 23 above the arm 22 is a circular table 25 to the underside of which is formed an integral beveled gearwheel 26, and in a like manner a similar circular table with its integral gearwheel (not shown) is mounted on the shaft of the arm 21 and in response to a swinging movement of the arms 21 and 22 either one of said beveled gearwheels, as may be desired, may be engaged or disengaged with a beveled pinion 27 that is fastened on one end portion of a shaft 28 as more clearly shown in Fig. 4 and shown by dotted circular lines in Fig. 2.

In order to communicate a swinging movement to the arms 21 and 22 to cause a desired one of their respective beveled gearwheels to operatively engage with the beveled pinion 27 there is provided a segment 29 of a gearwheel that is integral with the hub portion of the inner end portion of the arm 22, the teeth of which segment 29 are operatively engaged with the teeth of a beveled pinion 30 that is fastened on the adjacent end portion of a shaft 31, as more clearly shown in Fig. 3, whereby a rotation of said shaft 31 in one direction will swing the arms 21 and 22 to cause the gearwheel 26 on the arm 22 to engage with the pinion 27 and a rotation of said shaft 31 in the opposite direction will cause the other gearwheel on the arm 21 to engage with said pinion 27 thus to rotate a desired one of the tables, of which only the table 25 is shown.

The shaft 31 is rotatably mounted in bearings 32 and 33 to project rearwardly for a distance from the bearing 33 and upon such rearwardly projecting portion is mounted a sleeve 34 which is adapted in a well known manner to be slidably moved in lengthwise directions of said shaft 31 by a manipulation of a hand lever 35, but which is prevented from turning around said shaft 31 by means of a slot and feather not shown.

Fastened on each of opposite end portions of the sleeve 34 is a beveled friction wheel, as wheels 36 and 37, which wheels 36 and 37 are adapted, each at a different time, to engage with another beveled friction wheel 38 which is fastened on one end of a transversely disposed shaft that extends through a bearing 39, as shown more clearly in Fig. 1, such engagement being made in response to movements of the hand lever 35 thus to cause the shaft 31 to rotate in either one of two directions to swing the arms 21 and 22 in a desired direction.

On the other end of the shaft that extends through the bearing 39 is fastened a beveled gearwheel 40 which operatively engages with a beveled gearwheel 41 (as shown by dotted lines in Fig. 1) whose axis is at right angles to the axis of the gearwheel 40, and which is fastened on a shaft 42 upon which is fastened a pulley 43 which engages with a belt 44 which extends obliquely upward to engage with a pulley 45 that is fastened upon a main driving shaft 46 to which rotary motion is communicated by a belt, not shown, that may engage with a pulley 47 that is fastened on the rearward end portion of said shaft 46, thus when the shaft 46 is rotating, a manipulation of the hand lever 45 may cause the arms 21 and 22 to swing a desired one of their associated beveled gearwheels, like the gearwheels 26, into engagement with the beveled pinion 27, whereupon the respective one of said gearwheels with its table 25 may be rotated in response to a rotation of the shaft 28 which is parallel with and extends in the same vertical plane with the main driving shaft 46, and which extends from said pinion 27 rearwardly beyond the plane of the side stud 13, where it is provided with a gearwheel 48 whose teeth engages with a gearwheel 49 that is fixed on a jack-shaft 50 which is provided with a loose pulley 51 and a fast pulley 52, said pulleys 51 and 52 being associated with a belt 53 that extends obliquely upward to engage with a wide pulley 54 that is fastened on the main driving shaft 46, which belt 53 may be shifted by a belt shifter 55 to start and stop a rotation of the shaft 50 in response to a manipulation of a hand lever mechanism 56.

The rotatable tables, as table 25, associated with each of the arms 21 and 22, are adapted each to support and each at a different time to rotate a mold of any desired size which may be removably placed thereon, which mold, as indicated in the drawings, comprises separable parts that form an annular space within which may be disposed plastic earthy material to form a section of a conduit pipe, which separable parts may be described as follows: Removably disposed on the table 25 concentric therewith is a circular plate 57 which is provided with a concentrically disposed hole through which extends an upwardly projecting portion of the shaft 23.

Concentrically disposed to rest on the plate 57 is a hollow cylinder 58 whose internal surface is shaped to correspond to the form of the external surface of a section of conduit pipe to be molded, the bottom end of said cylinder 58 being provided with an internal flange 59.

An annular ring 60 is removably disposed to rest on said flange 59 in a position to adapt it to form an end surface of a section of conduit pipe, the bottom side of said annular ring 60 being provided with an annular ridge which engages with the side of an annular depression formed in the top surface of the plate 57, thus to maintain said ring 60 and cylinder 58 in concentric positions on the top of said plate 57.

Removably disposed to rest its bottom end wall on the plate 57, in a concentric position therewith to be surrounded by the hollow cylinder 58, is a cylindrical drum 61 of such external diameter as will form an annular space 62 between it and the inner surface of the hollow cylinder 58 which annular space 62 shall be equal in radial section to the thickness of the wall of the section of conduit pipe to be molded.

The cylindrical drum 61 is maintained in its concentric position by means of that portion of the shaft 23 which projects upwardly through the plate 57 into a recess formed in the center of the bottom wall of said cylindrical drum 61, as more clearly shown in Fig. 7.

Upon the top wall of the cylindrical drum 61 is fastened a lug 63 which is provided with a hole 64 extending therethrough, to which lug may be articulated a lifting bar of square cross-section like the lifting bar 65 shown more clearly in Fig. 2.

The hollow cylinder 58 comprises two separable semi-circular portions which are releasably locked together by a locking mechanism 66 provided on each of opposite sides of said hollow cylinder 58, whereby the said two semi-circular portions of said hollow cylinder 58 may be removed one at a time from a molded section of conduit pipe in an obvious manner.

In order to lift and raise the cylindrical drum 61 out of its position on the plate 57 to remove it from a section of conduit pipe molded therearound, the lifting bar 65, whose lower end portion is articulated with the lug 63, is extended upwardly through a square hole formed in a cross-bar 67 and provided with a head 68 whose underside may engage with the top surface of said cross-bar 67 when said cross-bar 67 is moved upwardly.

The shape of the lug 63, the square lifting bar 65 and the square hole in the cross-bar 67 through which said lifting bar 65 extends, serve to prevent the cylindrical drum 61 from revolving, in spite of revolutions of the table 25 and plate 57 upon which it rests, whereby, during the process of molding a section of pipe, the peripheral surface of the stationary drum 61 will smooth the internal surface of the revolving section of pipe so that when said section of pipe is completed the drum 61 may be freely raised out of said section of pipe to permit the table 25 with said section of pipe thereon to swing outwardly on its arm 21 or 22.

Removably mounted on the top of the cross-bar 67 to extend in a lengthwise direction thereof is a bar 69 secured by studs 70 which bar 69 is provided with a plurality of holes, as holes 71, in desired ones of which may be disposed bolts, like the two bolts 72, to each of which bolts 72 is articulated the upper end of a link, as links 73, to the lower ends of which links 73 is articulated an annular ring 74 whose internal diameter is such as will adapt it to be disposed to slip on to the upper end portion of the cylindrical drum 61 to the position shown in Fig. 7, in response to a continued falling movement of the cross-bar 67 after such cross-bar 67 has descended far enough to cause the cylindrical drum 61 to rest on the circular plate 57, such continued falling movement being permitted for the reason that the lifting bar 65 freely fits the square hole in the cross-bar 67 so that such cross-bar 67 may disengage its top surface from the underside surface of the head 68 of said lifting bar 65, and when said cross-bar 67 is again raised to a height where its top surface engages with said head 68, then the annular ring 74 will have been raised higher than the top end surface of the drum 61 in which position it will be adapted to be pulled to one side to its position shown by means of a link 75 that is articulated to the lower end of a weighted lever 76, said link 75 being provided with a plurality of holes, as holes 77, to adapt said link 77 to be articulated, at different points thereon, to said weighted lever 76 whereby said link 75 and the lever 76 may serve to connect with a link 73 when said link 73 is suspended by a bolt 72 that is disposed in any one of the several holes 71 in the adjacent end portion of the bar 69, the bolts 72 being changed to a different one of the holes when a smaller or larger annular ring 74 is used in the operation of molding a section of pipe of a different size.

The purpose of swinging the annular ring 74 is to permit the insertion of tamping tools into the annular space 62 during the operation of depositing within the mold earthy material until such earthy material reaches a point within said space 62 that is near the top end of the mold, whereupon the annular ring 74 is swung back into a position concentric with the drum 61 whereupon the cross-bar 67 may be lowered to dispose said annular ring 74 to rest on the top of said earthy material in a position indicated in Fig. 7 where said ring 74 serves to form an off-set in the molded section of pipes to adapt one end of said section of pipe to receive another end of another section of pipe to make a joint of a well known form, and after said ring 74 is thus disposed, then the remainder of the annular space 62 at the top of the mold may be completely filled to complete the operation of molding a section of pipe.

The cross-bar 67 is raised and lowered at times required by means of two vertical screw-threaded shafts 78 and 79 whose lower ends are pivoted in bearings formed in the top end portions of the studs 19 and 20 and whose upper end portions are journaled in bearing brackets 80 and 81, respectively, which are secured to the front ends of the top side rails 14 and 15, respectively, the opposite end portions of said cross-bar 67 being provided with screw-threaded bearings 82 and 83 within which the screw-threaded portions of the shafts 78 and 79 are rotatably disposed, thus to adapt said cross-bar 67 to be raised and lowered in response to a synchronous rotation of said shafts 78 and 79.

In order to communicate synchronous revolutions to said shafts 78 and 79 there is fastened on to the upper end of each of them a gearwheel, as gearwheels 84 and 85, both of which gearwheels 84 and 85 operatively engage with an idler gearwheel 86 which is rotatably mounted on a stud 87 that is fixed on the top of the cross rail 18, as shown more clearly in Fig. 1.

Disposed in operative engagement with the gearwheel 86 is a gearwheel 88 that is mounted on a vertical shaft 89 that is journaled in bearing brackets 90 and 91, the bracket 90 of which is fastened to the cross-rail 17 while the bearing 91 is fastened to a lower cross-beam 92.

Mounted on the vertical shaft 89 is a sleeve 93 which is slidable in endwise directions thereon but which is caused to rotate therewith by means of a key and feather of well known form.

Integral with the sleeve 93 are two beveled friction wheels 94 and 95 either of which may be caused to engage with the beveled friction wheel 96 at desired times by moving the sleeve 93 in a required direction, which movement may be effected by actuating a hand lever 97 which communicates vertical movements to said sleeve 93 through intermediate levers 98, 99 and 100 in an obvious manner.

The beveled friction wheel 96 is mounted on the adjacent end portion of the main driving shaft 46 which is journaled in a bearing bracket 101 which is fastened on the top of the cross-beam 92, as shown more clearly in Fig. 1.

Fastened on the shaft 46 adjacent to the cross-beam 92 is a pulley 102 which may communicate motion by a belt 103 either to a loose pulley 104 or to a pulley 105, both of which pulleys 104 and 105 are mounted on a shaft 106 rotatably disposed in the lower part of the frame of the structure, the belt 103 being shifted from one of said pulleys 104 and 105 to the other thereof (to start or stop the rotation of said shaft 106) by means of a belt shifter 107 that is actuated by a hand lever 108 that is connected with said belt shifter 107 by connecting links 109 and 110.

Fastened to the front end portion of shaft 106 is a disk 111 which is provided with a crank-pin, indicated by a circular dotted line 112 in Fig. 2, to which is articulated the lower end of a connecting rod 113 whose upper end is articulated to a cross-head 114, as shown more clearly in Fig. 4, which cross-head 114 is adapted to be guided in its vertical movements by a cylindrical guide rod 115 and a chambered guide bar 116.

Slidably mounted on the guide rod 115, and disposed in such engagement with the cross-head 114 as will cause it to be moved vertically in response to vertical movements of said cross-head 114, is a bracket arm 117 that is adapted to be rotatably moved to swing in a circle around said guide rod 115, and adjustably secured to said bracket arm 117 is an outwardly extended clamping arm 118 which is adapted adjustably to hold by frictional engagement a tamping bar 119 in a vertical position to adapt it to tamp earthy material within the annular space 62 of a mold that is disposed on the plate 57, as shown in Fig. 4, during the operation of filling said space 62, said frictional engagement being adjusted by a clamping screw 120 to permit said tamping bar to rise automatically as the amount of material in the space 62 increases.

Also mounted on the guide rod 115 under the bracket arm 117, and in a similar manner, is another bracket arm 121 whose outer end portion is provided with guiding means for guiding the vertical movements of a bar 122, which guiding means include an upper roller 123, that engages with the front side of said bar 122, and a lower roller 124 that engages with the rearward side of said bar 122; the bracket arm 121 being adapted to dispose the bar 122 within the space 62 of a mold in a vertical line adjacent to and in front of the tamping bar 119, as shown more clearly in Fig. 4, whereby said tamping bar 119 is in a position to strike its bottom end surface on to the top side surface of the rearwardly projecting portion of a shoe 125 that is fastened to the lower end of the bar 122 in response to reciprocal vertical movements of said tamping bar 119.

The bar 122 is partially counter balanced by a weight 126 attached to a cord 127 that runs over pulleys 128, 129 and 130 which is rotatably mounted on a bracket 131 secured to the bracket arm 121, whereby earthy material within a revolving mold may more readily raise said bar 122 as said mold is being filled with said earthy material.

Integral with the bracket arm 121 is a sidewise extended support 132 provided with gibs that serve slidingly to support a carriage 133 that may be moved in a horizontal plane by a screw rod 134 in response to the rotation of a crank 135, as more clearly shown in Fig. 6, and integral with said carriage 133 is a bifurcated arm 136 which extends upwardly to engage its bifurcated portions with the opposite sides of the clamping arm 118 whereby said clamping arm 118 and the bracket arm 121 may be moved with respect to their vertical planes.

Also connected with the bracket arm 121 is a curved rod 137 which extends to and is articulated with a hand lever 138, shown more clearly in Figs. 1 and 2, which hand lever 138 is provided with a detent 139 that engages with a notched segment 140, whereby said hand lever 138 may be detained in a position to cause the bracket arm 121 to be disposed in a required position for the tamping bar 119 to operate in any one of molds of different sizes.

In order to conduct plastic earthly material into a mold I have provided a chute 141 which may lead upwardly to connect with a hopper, not shown, which hopper may be supplied with said plastic earthy material.

Obviously by the structure herein described and illustrated by the drawings, plastic earthy material may be conducted through the chute 141 into a mold that is being revolved to fill said mold and tamp such material during the operation of filling such mold, whereupon said mold may be removed from its position and another empty mold be substituted therefor to be filled in a like manner, and such operations may be repeated as required successively to mold sections of pipe of a desired number and size, and the details of such operation are so manifest that further description is unnecessary for those skilled in the art.

Manifestly, changes may be made in the forms, dimenisons and arrangement of parts of my invention without departing from the spirit thereof.

What I claim is:

1. In a machine of the class described, the combination with a frame; of two horizontally swinging brackets adapted each to support and carry a mold and further adapted to be swung each at a different time to carry a mold to the same position within said frame and to support said mold in said position; controllable mechanism for communicating swinging movements to said brackets; means for communicating rotary motion to a mold disposed on either of said brackets while said mold is in said position within said frame; a counter-balanced bar slidably mounted in suitable guiding supports above said position within said frame, said bar being adapted to project downwardly into a mold disposed in said position; a shoe fixed on the lower end of said bar to rest on the surface of the contents of said mold whereby said bar will be raised in response to filling said mold with matter to be molded; a tamping rod frictionally supported adjacent to and parallel with said bar and adapted operatively to strike its lower end surface against the top surface of said shoe, thereby to tamp the contents of said mold; and means for communicating reciprocal vertical movements to said tamping rod.

2. A molding machine of the class described, which embodies a revoluble support for a mold; a bracket arm adjustably mounted on a suitable support to extend horizontally therefrom to a point over said revoluble support; a counter-balanced bar mounted to be vertically slidable on said bracket arm; a shoe fixed on the lower end of said counter-balanced bar; a tamping rod disposed adjacent to and parallel with said counter-balanced bar and adapted to strike its lower end surface on the top of said shoe in response to reciprocal vertical movements of said tamping rod; a supporting arm on which said tamping rod is frictionally mounted; a vertical guiding support on which said supporting arm is slidably mounted to adapt it to be reciprocally moved in vertical directions thereon; and means for communicating reciprocal vertical movements to said supporting arm.

3. A molding machine of the class described, which embodies a counter-balanced bar provided with a shoe on its lower end; a guiding support with which said counter-balanced bar is associated to be vertically slidable with respect thereto, said guiding support being adjustable in sidewise directions and in vertical directions; a tamping rod disposed adjacent to and parallel with said counter-balanced bar and adapted to strike its lower end surface on the top of said shoe in response to reciprocal vertical movements of said tamping rod; a supporting arm on which said tamping rod is frictionally and slidably mounted, said supporting arm being adjustable in sidewise directions; a vertical guiding support on which said supporting arm is slidably mounted to adapt it to be reciprocally moved in vertical directions; and means for communicating reciprocal vertical movements to said supporting arm.

In witness whereof, I hereunto subscribe my name this 8th day of January, A. D. 1917.

GEORGE McKENZIE.

Witnesses:
 FRANK WARREN,
 GEO. BLAIR.

Copies of this patent may be obtained for five cents each, by addressing the "Commissioner of Patents, Washington, D. C."